United States Patent
Smith et al.

(10) Patent No.: US 10,151,243 B2
(45) Date of Patent: Dec. 11, 2018

(54) COOLED COOLING AIR TAKEN DIRECTLY FROM COMBUSTOR DOME

(71) Applicant: Rolls-Royce Corporation, Indianapolis, IN (US)

(72) Inventors: Duane A. Smith, Carmel, IN (US); William G. Cummings, III, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 210 days.

(21) Appl. No.: 15/060,734

(22) Filed: Mar. 4, 2016

(65) Prior Publication Data
US 2016/0186661 A1    Jun. 30, 2016

Related U.S. Application Data

(63) Continuation-in-part of application No. 14/109,685, filed on Dec. 17, 2013, now abandoned.
(Continued)

(51) Int. Cl.
*F02C 7/18* (2006.01)
*F02C 3/24* (2006.01)
(Continued)

(52) U.S. Cl.
CPC ............. *F02C 7/185* (2013.01); *F02C 3/24* (2013.01); *F02C 7/18* (2013.01); *F02C 7/224* (2013.01);
(Continued)

(58) Field of Classification Search
CPC .... F02C 3/34; F02C 7/18; F02C 7/185; F02C 7/224; F02C 3/24; F05D 2240/36;
(Continued)

(56) References Cited

U.S. PATENT DOCUMENTS 2,552,851 A * 5/1951 Gist, Jr. ................... F23R 3/10
60/738
2,621,477 A * 12/1952 Powter ...................... F23R 3/26
236/104

(Continued)

FOREIGN PATENT DOCUMENTS

GB    676640 A    7/1952
GB    2098719 A    11/1982

OTHER PUBLICATIONS

International Search Report for PCT/US2013/068686 dated Sep. 18, 2014, 2 pp.

*Primary Examiner* — Scott Walthour
(74) *Attorney, Agent, or Firm* — Fishman Stewart PLLC

(57) ABSTRACT

A gas turbine engine includes a compressor, a turbine, and a combustor. The combustor includes a fuel injector and a vaporizer within the combustor positioned to receive liquid fuel from the fuel injector to vaporize the liquid fuel therein. The gas turbine engine includes an enclosed passage external to the combustor having a wall, a diffuser positioned to direct the air into the passage, causing the air to cool by transferring heat through the wall from the air within the passage to the vaporized fuel within the vaporizer, and a cooled cooling air passageway positioned to receive the air from the passage and direct the air after being cooled to at least one of the turbine and the compressor.

8 Claims, 2 Drawing Sheets

Related U.S. Application Data

(60) Provisional application No. 61/768,441, filed on Feb. 23, 2013.

(51) Int. Cl.
  *F23R 3/30* (2006.01)
  *F23R 3/00* (2006.01)
  *F02C 7/224* (2006.01)
  *F23R 3/26* (2006.01)
  *F23R 3/32* (2006.01)

(52) U.S. Cl.
  CPC .............. *F23R 3/002* (2013.01); *F23R 3/005* (2013.01); *F23R 3/26* (2013.01); *F23R 3/30* (2013.01); *F23R 3/32* (2013.01); *F05D 2240/36* (2013.01); *F05D 2260/207* (2013.01); *F23R 2900/03043* (2013.01); *Y02T 50/671* (2013.01); *Y02T 50/676* (2013.01)

(58) Field of Classification Search
  CPC .... F05D 2260/207; F23R 3/002; F23R 3/005; F23R 3/26; F23R 3/30; F23R 3/32; F23R 2900/03043
  See application file for complete search history.

(56) References Cited

U.S. PATENT DOCUMENTS

| | | | | |
|---|---|---|---|---|
| 2,628,475 | A * | 2/1953 | Heath | F23R 3/32 |
| | | | | 60/738 |
| 2,635,426 | A * | 4/1953 | Meschino | F23R 3/30 |
| | | | | 60/39.826 |
| 2,977,760 | A * | 4/1961 | Soltau | F23R 3/16 |
| | | | | 60/738 |
| 3,535,875 | A * | 10/1970 | Litke | F23R 3/30 |
| | | | | 60/738 |
| 4,120,150 | A | 10/1978 | Wakeman | |
| 4,255,122 | A * | 3/1981 | Alpkvist | F23C 3/00 |
| | | | | 431/215 |
| 4,291,531 | A * | 9/1981 | Campbell | F02C 7/18 |
| | | | | 60/39.511 |
| 5,581,996 | A | 12/1996 | Koch et al. | |
| 6,276,896 | B1 * | 8/2001 | Burge | F01D 5/048 |
| | | | | 415/115 |
| 6,295,803 | B1 | 10/2001 | Bancalari | |
| 6,672,072 | B1 | 1/2004 | Giffin, III | |
| 7,000,404 | B2 | 2/2006 | Palmisano et al. | |
| 7,600,382 | B2 | 10/2009 | Ralls, Jr. | |
| 2016/0230998 | A1 * | 8/2016 | Frish | F02C 7/18 |
| 2017/0218845 | A1 * | 8/2017 | Snyder | F02C 7/185 |

\* cited by examiner

COOLED COOLING AIR TAKEN DIRECTLY FROM COMBUSTOR DOME

CROSS-REFERENCE TO RELATED APPLICATIONS

This application is a continuation-in-part of, and claims priority to, U.S. Nonprovisional patent application Ser. No. 14/109,685 filed Dec. 17, 2013, which claims priority to U.S. Provisional Patent Application No. 61/768,441 filed Feb. 23, 2013, the contents of which are hereby incorporated in their entirety.

TECHNICAL FIELD

The present disclosure generally relates to gas turbine engine heat exchangers, and more particularly to fuel/air heat exchangers and cooling associated therewith.

BACKGROUND

The ability to provide cooling within a region of a combustor remains an area of interest. Gas turbine engines with high compressor discharge temperature, either through high compression ratio or high Mach flight speed, have reduced capacity for turbine cooling. That is, as the compressor discharge temperature rises, there is less ability to remove heat from the turbine. Thus, additional airflow may be desired, or the cooling capacity of the air can be increased by cooling the cooling air. Cooled cooling air is generally facilitated by bleeding a portion of the high temperature compressed air outside of the core gas path into a heat exchanger that is situated in an airstream with a lower air temperature. Heat is removed from the cooled cooling air via the heat exchanger and the air is then routed back into the core of the engine to cool the turbine hot section, and/or the compressor. In such systems, the heat exchanger may remove heat from the cooled cooling air using either a low temperature air source, or fuel as a heat sink.

Thus, heat exchangers may be employed to reduce the temperature of the compressor discharge air to provide adequate cooling capacity, but they can be bulky, intrusive, and they add complexity to the overall engine design and operation.

Accordingly, there remains a need for further contributions in this area of technology.

SUMMARY

The present disclosure includes examples of cooled cooling air in which vaporizing fuel is used as a heat sink to transfer heat from the cooled cooling air as exchanged through a combustion liner wall. Further examples, forms, features, aspects, benefits, and advantages of the present application shall become apparent from the description and figures provided herewith.

DETAILED DESCRIPTION

For the purposes of promoting an understanding of the principles of the disclosure, reference will now be made to the drawings and specific language will be used to describe the same. It will nevertheless be understood that no limitation of the scope of the disclosure is thereby intended. Any alterations and further modifications in the described examples, and any further applications of the principles of the disclosure as described herein are contemplated as would normally occur to one skilled in the art to which the disclosure relates.

Figure 1:
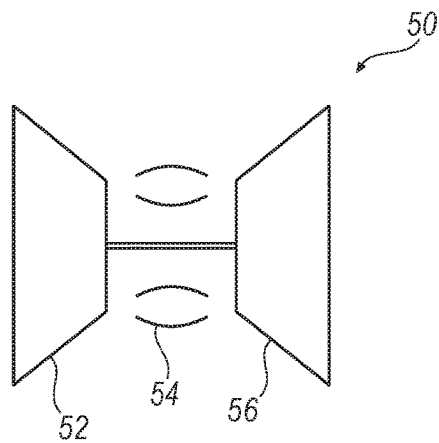
FIG. 1 depicts one example of a gas turbine engine.

With reference to FIG. 1, a gas turbine engine 50 is disclosed having a compressor 52, a combustor or combustor assembly 54, and turbine 56, and gas turbine engine 50 can be used in some examples as a power source. In one form the gas turbine engine 50 is used as a powerplant for an aircraft. As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present disclosures are contemplated for utilization in other applications that may not be coupled with an aircraft such as, for example, industrial applications, power generation, pumping sets, naval propulsion, weapon systems, security systems, perimeter defense/security systems, and the like known to one of ordinary skill in the art.

The gas turbine engine 50 can take a variety of forms in various examples. Though depicted as an axial flow single spool engine, in some forms the gas turbine engine 50 can have multiple spools and/or can be a centrifugal or mixed centrifugal/axial flow engine. In some forms the engine 50 can be a turboprop, turbofan, or turboshaft engine. Furthermore, the engine can be an adaptive cycle and/or variable cycle engine. Other variations are also contemplated.

Figure 2:
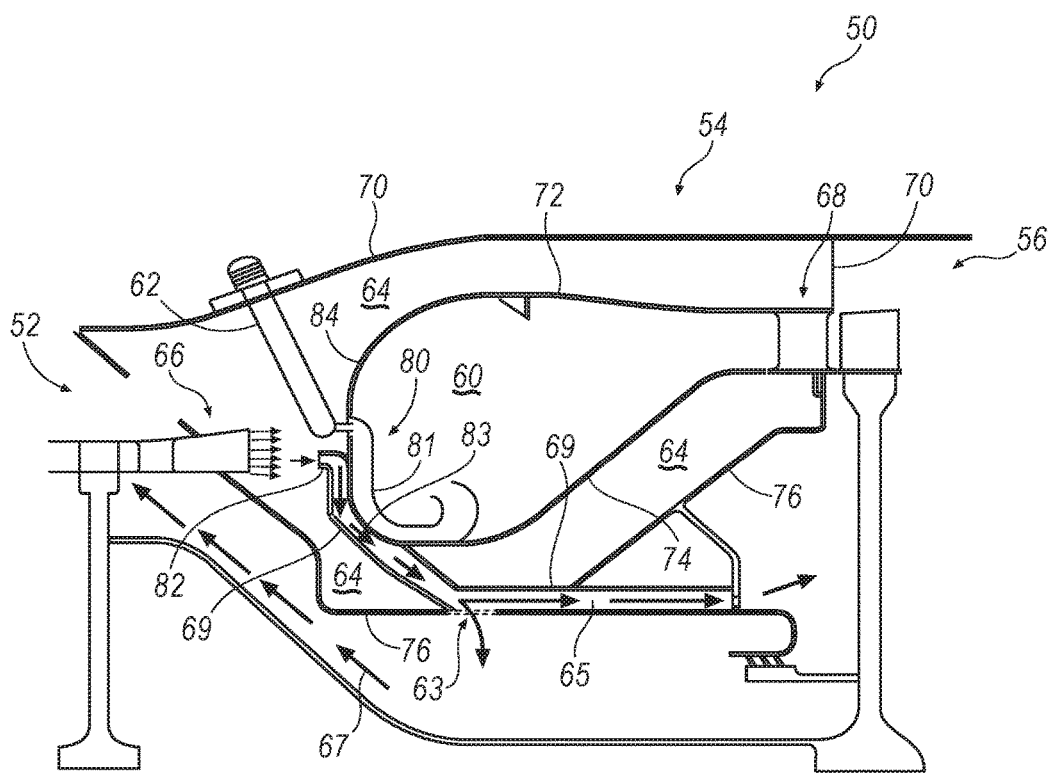
FIG. 2 depicts an example of a combustor of the gas turbine engine in which cooled cooling air is provided using the latent heat of vaporization of the fuel.

FIG. 2 illustrates exemplary gas turbine engine 50 in which air within the gas turbine engine is cooled by vaporizing fuel proximate a flow of air to the combustor 54. Gas turbine engine 50 includes an inner combustion portion 60 that can take on any variety of configurations, one example of which is shown below in FIG. 2. In various examples the inner combustion portion 60 can be defined by walls, liners, domes, cans, or combinations thereof. In some forms the structures that define the inner combustion portion 60 need not be solid but can be perforated, have slots, holes, etc. for the passage of working fluid such as air. The various openings provided for air entrance to the inner combustion portion 60 can be used to convey working fluid to participate directly in the combustion process, and/or can be used for dilution air, cooling air, etc. In one form the inner combustion portion 60 can be defined by liners offset from each other that are coupled through a combustor dome. In some examples of the combustor 54, fuel injectors or nozzles can protrude through the structure that defines the inner combustion portion 60. It will be generally understood that the inner combustion portion 60 can include areas that do not locally include a combustion process, but that nevertheless the inner combustion portion 60 is in part defined by structure that generally separates it from an exterior portion 64. In one example, some upstream areas of the inner combustion portion 60 that are substantially free from fuel will not include a combustion process, but nevertheless that area will generally be considered part of the inner combustion portion 60 or combustor assembly 54.

The exterior portion 64 extends between the inner combustion portion 60 and one or more structures that define the exterior portion 64. The exterior portion 64 may not be the same size and shape at all axial/circumferential locations relative to the inner combustion portion 60. In fact, the exterior portion 64 may not entirely surround the inner combustion portion 60. The exterior portion 64 can be defined by various structures of the gas turbine engine 50. The exterior portion 64 can be defined by a casing, for example. In general it will understood that the exterior portion 64 includes a boundary for a flow path for working fluid that is located outside of the inner combustion portion 60 but that nonetheless is a flow path for fluid that is eventually expelled such as through the turbine 56.

Fuel can be delivered to the inner combustion portion 60 through a variety of manners including via an injector, nozzle, etc. in any of various states, such as liquid, vapor, mixed, etc. The schematic example disclosed in FIG. 2 depicts a fuel passage or fuel injector 62 which conveys a liquid fuel from a location outside of the combustor 54 to a location into the inner combustion portion 60, in which combustion occurs with air provided as is commonly known.

FIG. 2 depicts an example of gas turbine engine 50 having the combustor or combustor assembly 54, and in which the compressor 52 and turbine 56 are depicted as axial flow turbomachinery components. Other forms and combinations of the compressor 52 and turbine 56 are contemplated herein, whether of the centrifugal or mixed axial-centrifugal types. The combustor 54 of the illustrated example is depicted as a straight flow-through combustor and is of the annular configuration, but other forms of the combustor 54 are also contemplated. A compressor discharge, via a diffuser 66 in the illustrated example, provides compressed air to the combustor 54, and to a turbine inlet, via a turbine inlet guide vane 68, that receives working fluid from the combustor 54 as combustion by-products.

The combustor 54 depicted in FIG. 2 includes an outer casing 70, outer liner 72, inner liner 74, and inner casing 76. Fuel injector 62 extends into the combustor 54 to deliver fuel to the inner combustion portion 60 where combustion occurs. In one form the fuel injector 62 delivers fuel to within the inner combustion portion 60 in a liquid form, or in a combination of liquid and vapor. The liquid can be present as a stream, film, droplets, etc. In the illustrated example the fuel injector 62 conveys fuel to a vaporizer 80 within which the fuel introduced to the vaporizer in liquid form can turn from the liquid to a vapor. In one example, vaporizer 80 is a tube through which fuel passes during vaporization of the fuel. Vaporizer 80 includes a wall 81 and is also bounded, in the example shown, by a wall 83 that forms part of inner liner 74 of combustor 54. Fuel passes from fuel injector 62 into vaporizer 80, wherein fuel vaporization occurs, causing the temperature of the fuel to drop during the vaporization process. In such fashion, the latent heat of vaporization for the fuel can be taken advantage of to cool air within the combustor 54 and as the fuel passes within vaporizer 80. Thus, the disclosed apparatus and method leverage fuel vaporization to cool compressor discharge air, instead of using another air source or heat exchanger to cool air proximate the combustor, to improve overall thermal efficiency. Various configurations of the vaporizer 80 are contemplated beyond the example depicted in FIG. 2.

An enclosed cooling passage 69 is configured to extend between an area in thermal communication with fuel delivered internal to the combustor 54 to one or more areas outside of the combustor 54. In the illustrated example, the cooling passage 69 extends from an area in thermal communication with the vaporizer 80, to an inner part of the inner casing 76 before cooling fluid flows either aft or downstream through a cooled cooling air passageway 65 to the turbine 56, or forward/upstream through a cooled cooling air passageway 67 to the compressor 52. In one example, flow is split 63 to flow through both passageways 65, 67 to both the turbine 56 and the compressor 52. The cooled cooling passage 65 extends along outer portion 69 of the inner casing 76. In still other examples, the cooling passage 65 can extend across the exterior portion 64 in other locations besides the area depicted in the illustrated example. For example, the cooling passage 69 can extend across the portion 64 on a side opposite the inner combustion portion 60 depicted in FIG. 2. Any variety of other locations, configurations, orientations, etc. of the cooling passage 69 as it exits the combustor 54 are contemplated herein. As seen in the illustrated example, the cooling passage 69 extends across the outer combustion portion 64 as it extends downstream and away from the area that it is in thermal communication with the fuel (in the illustrated example, the vaporizer 80 serves as part of the heat exchange between the fuel and working fluid in the cooling passage 69, and the heat exchange occurs through wall 83).

The cooling passage 69 includes an inlet 82 structured to receive working fluid from the diffuser 66 which can come as compressor discharge through the diffuser 66 in the example of FIG. 2. The inlet 82 can have a variety of shapes and sizes, and in one form can be integrated with one or more components of the combustor 54. The inlet 82 is offset from a dome 84, but in some forms one or more parts of the inlet 82 can be formed from the dome 84. For example, the inlet 82 can include an outer lip offset from the dome 84, while the dome 84 itself forms the inner lip. In this manner the inlet 82 can take the form of a scoop. Other configurations are contemplated herein. The inlet 82 can be positioned upstream of, coincident with, or downstream of an area of heat exchange between working fluid or air that gives up heat and the fuel that absorbs it. One or more cooling passages 69 can be arranged in the combustor(s) 54 of the gas turbine engine 50.

In the illustrated example, cooled cooling air is routed from the cooling passage 69 to both the compressor 52 and the turbine 56. In other examples the cooling passage 69 can route cooled cooling air to either, or both of, the compressor 52 and turbine 56. In addition, the cooling air that is routed within the cooling passage 69 can be pulled from working fluid that would be provided to the inner combustion portion 60 and/or from the working fluid that would be routed to the outer combustion portion 64.

Thus, referring still to FIG. 2, the illustrated gas turbine engine 50 includes compressor 52, turbine 56, and combustor 54. Combustor 54 includes a fuel injector 62 and a vaporizer 80 within the combustor 54 positioned to receive liquid fuel from the fuel injector 62 to vaporize the liquid fuel therein. The turbine engine 50 includes an enclosed passage 69 external to the combustor 54 having a wall 83 through which heat transfer occurs, and a diffuser 66 positioned to direct the air into the passage 69, causing the air to cool by transferring heat through the wall 83 from the air within the passage 69 to the vaporized fuel within the vaporizer 80. The cooled cooling air passageways 65, 67 are positioned to receive the cooled air from the passage 69 and direct the cooled air to at least one of the turbine 56 and the compressor 52.

As illustrated in FIG. 2, wall 83 is positioned between the combustor portion 60 of combustor 54 and the passage 69. The wall 83 is common to both the combustor 54 and the passage 59. The fuel passes within the vaporizer 80 in parallel with and in the same direction as the air passing within the passage 69. In such fashion, cooled cooling air is provided directly in, and taken from, the combustor dome via the use of the latent heat of vaporization of the fuel.

Figure 3:
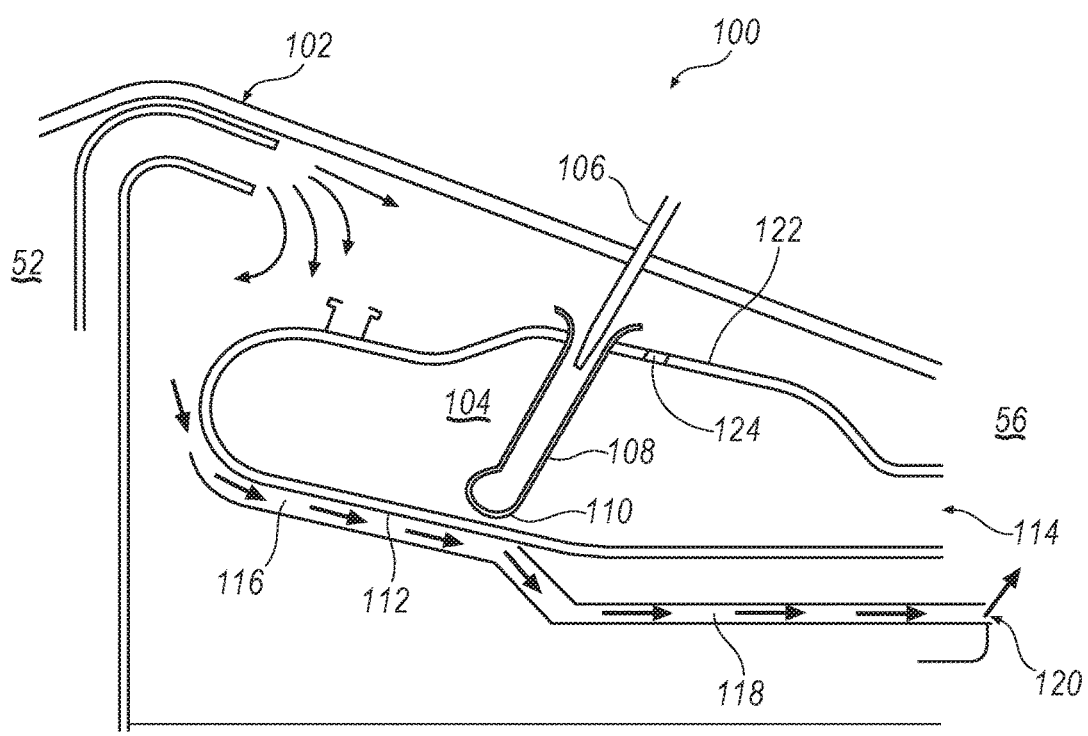
FIG. 3 depicts another example of a combustor of the gas turbine engine in which cooled cooling air is provided using the latent heat of vaporization of the fuel.

However, according to another example, vaporized fuel is directed toward a wall wherein the heat transfer occurs to cool the cooling air. Referring to FIG. 3, gas turbine engine 50 having a compressor 52 and a turbine 56 includes an example of a combustor or combustor assembly 100, in lieu of combustor or combustor assembly 54 of FIG. 2. In the illustrated arrangement, combustor 100 includes compressor discharge via a diffuser 102. The compressor discharge provides compressed air to combustor 100, and particularly to a combustion portion 104 wherein combustion occurs. Liquid fuel, as described above, is provided to combustion portion 104 via a fuel injector 106 and to a vaporizer 108. Fuel is vaporized in vaporizer 108 and exits vaporizer 108 at a vaporizer exit 110. Vaporized fuel at vaporizer exit 110 is directed toward a wall 112 or liner of combustion portion 104. Vaporized fuel passes into combustion portion where combustion occurs. Combustion by products pass through a combustor exit 114 to turbine 56.

Air from diffuser 102 passes into an enclosed passage 116 that is external to combustion portion 104 and external to wall 112. The vaporized fuel that exits vaporizer 108 impinges on the wall 112 at vaporizer exit 110, causing the wall 112 to cool in the region of exit 110. Air passing through enclosed passage 116 passes proximate exit 110, causing the air to cool while transferring heat from the air to the fuel through wall 112. The air continues to pass into a cooled cooling air passageway 118. The cooled cooling air passageway 118 passes at an exit 120 downstream toward turbine 56 in one example. However, in another example the air at exit 120 may pass forward or upstream and toward the compressor 52. In one example, a combustion liner wall 122 of combustor portion 104 includes air admission ports 124 for passing air into combustion portion 104. Air admission ports 124 are positioned laterally and out of plane of fuel injector 106 within combustion liner wall 122. As such, vaporized fuel is directed toward the wall 112, and in one example the vaporized fuel is directed in an approximately orthogonal direction with respect to the wall.

As such, disclosed are examples that provide cooled cooling air which use vaporized fuel as a heat sink to transfer heat from the cooled cooling air as exchanged through a combustion liner wall. A fuel injector sprays fuel into a vaporizer tube which is mounted in concert with air admission ports on an outer combustion liner wall. The fuel is transported down the vaporizer tube with the effluent discharged along the inner combustion liner wall, removing heat from the compressor discharge air as it flows along a passage or passages in intimate contact with the combustion liner surface. The cooled cooling air is collected and discharged for hot section cooling, which may include the compressor and/or the turbine, as examples. Thus, a coordinated flow motion is employed between the air admission ports and the effluent from the vaporizer tube to establish a bulk rotating primary combustion zone. The primary combustion zone is shaped and sized to enhance heat transfer of the cooled cooling air. In one example, the fuel injector is placed centrally within and near an upper inlet of the vaporizer tube, such as vaporizer 108 of FIG. 3. The axial portion of the fuel injector within the vaporizer tube can be varied so that the injector discharge is moved downstream to create effluent discharge that is favorable for maximizing heat transfer with the cooled cooling air.

Further, disclosed is a method of cooling a gas turbine that includes, referring back to FIG. 2, vaporizing a fuel within vaporizer 80 that is within combustor 54. The method includes passing air into enclosed passage 69, external to combustion portion 60 of combustor 54, such that heat transfers through wall 83, from the air to the fuel, causing the air to cool. The method further includes passing the air that has been cooled to one of the turbine 56 and the compressor 52.

Thus, according to the disclosed examples, the temperature of the cooling air for high-pressure compressor and turbine cooling can be reduced so as to preserve or improve compressor shaft and rim, and turbine disc and blade lives that may result from high temperature cycles. Fuel is used as a coolant, thereby keeping heat taken from the cooled cooling air in the core of the engine, where its heat provides maximum useful work for the cycle. One advantage is that fuel de-oxygenation may not be required due to the disclosure. Another advantage is that low-cost and lightweight fuel injectors may be used.

In the event of damage, e.g., cracking, to the combustor dome, the cooling function can still be safely performed and cooled cooling air still delivered to the intended components with minimal loss of function. That is, because of the pressure drop across the combustor, air will drive into the combustor through any cracks that develop rather than fuel into the cooling air. This is in contrast to a fuel/air heat exchanger in the bypass duct, which, if leaking internally, may mix air and fuel together into the cooling air stream whose temperature may then rise as the fuel releases its energy content. In addition, the disclosed examples eliminate the need for a heat exchanger in the bypass duct, eliminating the penalty that is incurred in terms of pressure and thermal losses, which may also reduce the overall system weight. The cooled cooling air is delivered at a pressure greater than that coming from a heat exchanger, making cooling air available for more components in the high-pressure section of the engine.

While the disclosure has been illustrated and described in detail in the drawings and foregoing description, the same is to be considered as illustrative and not restrictive in character, it being understood that only the preferred examples have been shown and described and that all changes and modifications that come within the spirit of the disclosures are desired to be protected. It should be understood that while the use of words such as preferable, preferably, preferred or more preferred utilized in the description above indicate that the feature so described may be more desirable, it nonetheless may not be necessary and examples lacking the same may be contemplated as within the scope of the disclosure, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A combustor assembly for a gas turbine engine, the combustor assembly comprising:
   an outer casing;
   an inner casing;
   at least one liner defining an inner combustion volume;

an exterior volume defined between the outer casing and the inner casing, a first portion of the exterior volume being defined between the outer casing and the inner combustion volume, a second portion of the exterior volume being defined between the inner casing and the inner combustion volume, and a third portion of the exterior volume extending forward of the inner combustion volume;

a fuel injector;

a vaporizer within the inner combustion volume and positioned to receive liquid fuel from the fuel injector, the vaporizer being configured to vaporize the liquid fuel to form a vaporized fuel;

an enclosed passage external to the inner combustion volume and positioned at a forward end of the inner combustion volume, the enclosed passage having an inlet positioned between the outer casing and the inner casing in the third portion of the exterior volume, a first wall portion in common with the inner combustion volume, a second wall portion extending from the inlet and connected to the inner casing, and a third wall portion, wherein the first wall portion is a portion of the at least one liner, the enclosed passage configured to receive air from a diffuser, wherein the received air is cooled in the enclosed passage via heat transfer through the first wall portion from the received air within the enclosed passage to the vaporized fuel within the vaporizer; and a cooled cooling air passageway positioned to receive the cooled air from the enclosed passage and split a flow of the cooled air to direct a first portion of the flow of the cooled air to a turbine and a second portion of the flow of the cooled air to a compressor;

wherein the third wall portion of the enclosed passage extends from the first wall portion and across the second portion of the exterior volume and is connected to the cooled cooling air passageway.

2. The combustor assembly as claimed in claim 1, wherein the vaporized fuel flows within the vaporizer in parallel with, and in the same direction as, the air flowing within the enclosed passage.

3. The combustor assembly as claimed in claim 1, wherein the vaporized fuel is directed toward the first wall portion.

4. The combustor assembly as claimed in claim 1, wherein the first portion of the flow of the cooled air passes through a portion of the cooled cooling air passageway, the portion of the cooled cooling air passageway extending aft of a flow split location at which the flow of the cooled air is split into the first portion of the flow of the cooled air and the second portion of the flow of the cooled air.

5. A gas turbine engine, comprising:
a compressor having a diffuser;
a turbine; and
a combustor assembly, comprising:
an outer casing;
an inner casing;
at least one liner defining an inner combustion volume;
an exterior volume defined between the outer casing and the inner casing, a first portion of the exterior volume being defined between the outer casing and the inner combustion volume, a second portion of the exterior volume being defined between the inner casing and the inner combustion volume, and a third portion of the exterior volume extending forward of the inner combustion volume;

a fuel injector;

a vaporizer within the inner combustion volume, the vaporizer being positioned to receive liquid fuel from the fuel injector to vaporize the liquid fuel therein;

an enclosed passage external to the inner combustion volume and positioned at a forward end of the inner combustion volume, the enclosed passage having an inlet positioned between the outer casing and the inner casing in the third portion of the exterior volume, a first wall portion in common with the inner combustion volume, a second wall portion extending from the inlet and connected to the inner casing, and a third wall portion, wherein the first wall portion is a portion of the at least one liner, the enclosed passage being configured to receive air from the diffuser, wherein the air within the enclosed passage is cooled via heat transfer through the first wall portion from the air within the enclosed passage to the vaporized fuel within the vaporizer; and a cooled cooling air passageway positioned to receive the air from the enclosed passage, split a flow of the air at a flow split location, and direct a first portion of the flow of the air to the turbine and a second portion of the flow of the air to the compressor;

wherein the third wall portion of the enclosed passage extends from the first wall portion and across the second portion of the exterior volume and is connected to the cooled cooling air passageway.

6. The gas turbine engine as claimed in claim 5, wherein the vaporized fuel flows within the vaporizer in parallel with, and in the same direction as, the air flowing within the enclosed passage.

7. The gas turbine engine as claimed in claim 5, wherein the vaporized fuel is directed toward the first wall portion.

8. The gas turbine engine as claimed in claim 5, wherein the first portion of the flow of the air passes through a portion of the cooled cooling air passageway, the portion of the cooled cooling air passageway extending aft of the flow split location.

* * * * *